(12) United States Patent
Walker

(10) Patent No.: US 10,779,694 B1
(45) Date of Patent: Sep. 22, 2020

(54) TOILET TRAINER

(71) Applicant: Hussain Walker, Jersey City, NJ (US)

(72) Inventor: Hussain Walker, Jersey City, NJ (US)

( * ) Notice: Subject to any disclaimer, the term of this patent is extended or adjusted under 35 U.S.C. 154(b) by 258 days.

(21) Appl. No.: 15/906,640

(22) Filed: Feb. 27, 2018

(51) Int. Cl.
*G09B 19/00* (2006.01)
*A47K 17/00* (2006.01)

(52) U.S. Cl.
CPC .......... *A47K 17/00* (2013.01); *G09B 19/0076* (2013.01)

(58) Field of Classification Search
USPC ......... 434/236, 247, 258, 260; 4/300.3, 661, 4/902; 446/153, 156, 159; D23/310
See application file for complete search history.

(56) References Cited

U.S. PATENT DOCUMENTS

| | | | |
|---|---|---|---|
| 2,361,677 A | 10/1944 | Bramhall | |
| 2,703,407 A | 3/1955 | Henoch et al. | |
| 3,652,090 A | 3/1972 | Semmens | |
| D227,108 S | 6/1973 | Halenar | |
| 4,044,405 A | 8/1977 | Kreiss | |
| 4,832,046 A * | 5/1989 | Parrish | A61B 10/007 600/549 |
| 5,117,512 A * | 6/1992 | Bressler | E03D 9/00 4/300.3 |
| 5,560,051 A | 10/1996 | Butts | |
| 5,671,485 A * | 9/1997 | Middlestead | E03D 9/00 248/99 |
| 5,809,590 A * | 9/1998 | Williams | A47K 11/12 4/300.3 |
| 6,416,853 B1 * | 7/2002 | Nakashima | A63H 33/22 428/29 |
| 6,513,173 B1 * | 2/2003 | Sykes | A47K 11/12 4/301 |
| D481,448 S | 10/2003 | Argentina | |
| 6,708,350 B2 * | 3/2004 | Devereux | A47K 13/24 4/300.3 |
| 6,772,454 B1 | 8/2004 | Barry et al. | |
| 6,811,403 B1 * | 11/2004 | Camarena | G09B 19/0076 434/247 |
| 7,017,198 B2 * | 3/2006 | Conn | E03D 13/005 4/300.3 |
| 7,178,177 B1 * | 2/2007 | Valencia | A47K 13/24 4/300.3 |
| 7,353,549 B2 * | 4/2008 | Muir, Jr. | A47K 13/24 4/661 |
| 7,798,907 B2 | 9/2010 | Piccionelli et al. | |
| 8,784,110 B2 | 7/2014 | Hug et al. | |
| D787,031 S * | 5/2017 | Morgan-Williams | D23/307 |
| 10,278,553 B2 * | 5/2019 | Barringer | A47K 17/00 |
| 2006/0179563 A1 * | 8/2006 | Kneese | A47K 11/105 4/661 |
| 2006/0260497 A1 * | 11/2006 | Neale | A47K 11/105 101/494 |
| 2008/0307592 A1 | 12/2008 | Cornelius | |

(Continued)

*Primary Examiner* — Kurt Fernstrom
(74) *Attorney, Agent, or Firm* — Cramer Patent & Design, PLLC; Aaron R. Cramer

(57) ABSTRACT

A toilet training device has a pair of hook-shaped handles on opposite sides of the base. The base is recessed in at least two (2) regions which prevents the base from covering the entire surface area of the toilet bowl water. Further, the base has a shape able to contour to the interior shape of the toilet bowl. A plurality of decorative targets is disposed upon the upper surface of the base. The exterior surface of the base is coated with a thermochromic pigment.

18 Claims, 5 Drawing Sheets

(56) References Cited

U.S. PATENT DOCUMENTS

| | | |
|---|---|---|
| 2010/0003655 A1 | 1/2010 | Stephenson, Jr. |
| 2011/0318720 A1 | 12/2011 | Giard |
| 2012/0267856 A1 | 10/2012 | Swan et al. |
| 2013/0084550 A1* | 4/2013 | Mackie .................. A47K 17/00 434/247 |
| 2013/0157236 A1* | 6/2013 | Yang .................. G09B 19/0076 434/247 |
| 2014/0127657 A1* | 5/2014 | Traxler .............. G09B 19/0076 434/247 |

\* cited by examiner

TOILET TRAINER

RELATED APPLICATIONS

Not applicable.

FIELD OF THE INVENTION

The present invention relates generally to the field of toilet training and more specifically relates to a target designed to be positioned within a toilet bowl to facilitate toilet training.

BACKGROUND OF THE INVENTION

Toilet training is the process of training a child to use the toilet for urination and/or bowel movements. Most people advise that toilet training is a mutual task, requiring cooperation, and a variety of creative techniques to encourage the child to urinate in the toilet. Great techniques emphasize consistency and positive reinforcement over punishment which may make it more enjoyable for the young child.

Young boys, in particular, may pose a challenge during toilet training. Young boys will sometimes miss aiming their urine stream in the toilet causing a mess. Motivation for the child to aim their urine stream in the toilet bowl is therefore desired. Targets provide a creative challenge that creates motivation for young boys during the toilet training process. However, a creative target with a suitable mounting assembly for within a toilet bowl has yet to be disclosed. Therefore, a suitable solution is required.

Various attempts have been made to solve problems found in toilet training art. Among these are found in: U.S. Pat. No. 7,798,907; and U.S. Pat. App. Pub. Nos. 2014/0134583; and 20050177937. These prior art references are representative of targets designed to be positioned within a toilet bowl to facilitate toilet training.

None of the above inventions and patents, taken either singly or in combination, is seen to describe the invention as claimed. Thus, a need exists for a reliable target for toilet training with an improved mounting assembly and interactive target aids, and to avoid the above-mentioned problems.

SUMMARY OF THE INVENTION

The principles of the present invention provide for such a toilet training aid that includes a body, a first target attached to the body and extending away therefrom with at least one (1) first target support, a second target attached to the body adjacent said first target and extending away therefrom with at least one (1) second target support, and a pair of mounts, each adjustably attached to opposing sides of the body. The pair of mounts are capable of securely encompassing a portion of a toilet bowl rim to suspend the body within a toilet bowl. In at least one (1) embodiment, a portion of the body can be coated with a thermal-activated coating.

It is therefore an object of the present invention to provide such a body to include a planar bottom wall sloping downward from a rear side towards a front side, a curvilinear first side wall affixed to and vertically extending away from a first perimeter edge of the bottom wall, a first hook support affixed to the first side wall adjacent an upper edge thereof, a curvilinear second side wall affixed to and vertically extending away from a first perimeter edge of the bottom wall, a second hook support affixed to the second side wall adjacent an upper edge thereof, and a curvilinear rear wall affixed to and vertically extending away from a perimeter edge of the bottom wall rear side, having a first side edge affixed to a first side wall rear edge and having a second side edge affixed to a second side wall rear edge. A first one (1) of said pair of mounts is removably attachable to the first hook support. A second one (1) of said pair of mounts is removably attachable to the second hook support. The first and second target are each affixed to and extend away from the rear wall. In certain embodiments, the first side wall, second side wall, and rear wall comprise a shape generally matching that of an interior surface of a rear side of the toilet bowl. In other embodiments, a protrusion is located at a center of the bottom wall front side, coplanar with the bottom wall.

It is another object of the present invention to provide where the first target includes a shaft, a first cap located at first distal end of the shaft, a first rotating member independently rotatable relative to the shaft and located adjacent to the first distal end of the shaft, further having a pair of first target elements located on either side of the shaft, a second rotating member independently rotatable relative to the shaft and located at a center of the shaft, further having a pair of second target elements located on either side of the shaft, a third rotating member independently rotatable relative to the shaft and located adjacent to the second distal end of the shaft, further having a pair of third target elements located on either side of the shaft; a first target support having a first end affixed to the shaft between the first and second rotating member and a second end affixed to the rear wall, and a second target support having a first end affixed to the shaft between the second and third rotating member and a second end affixed to the rear wall. In at least one (1) embodiment, the pair of first target elements have a triangular cross-section, the pair of second target elements have a square cross-section, and the pair of third target elements have a circular cross-section. In other embodiments, the first and second target support are each mounted to the rear wall at an angle directing the first and second target towards the bottom wall.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
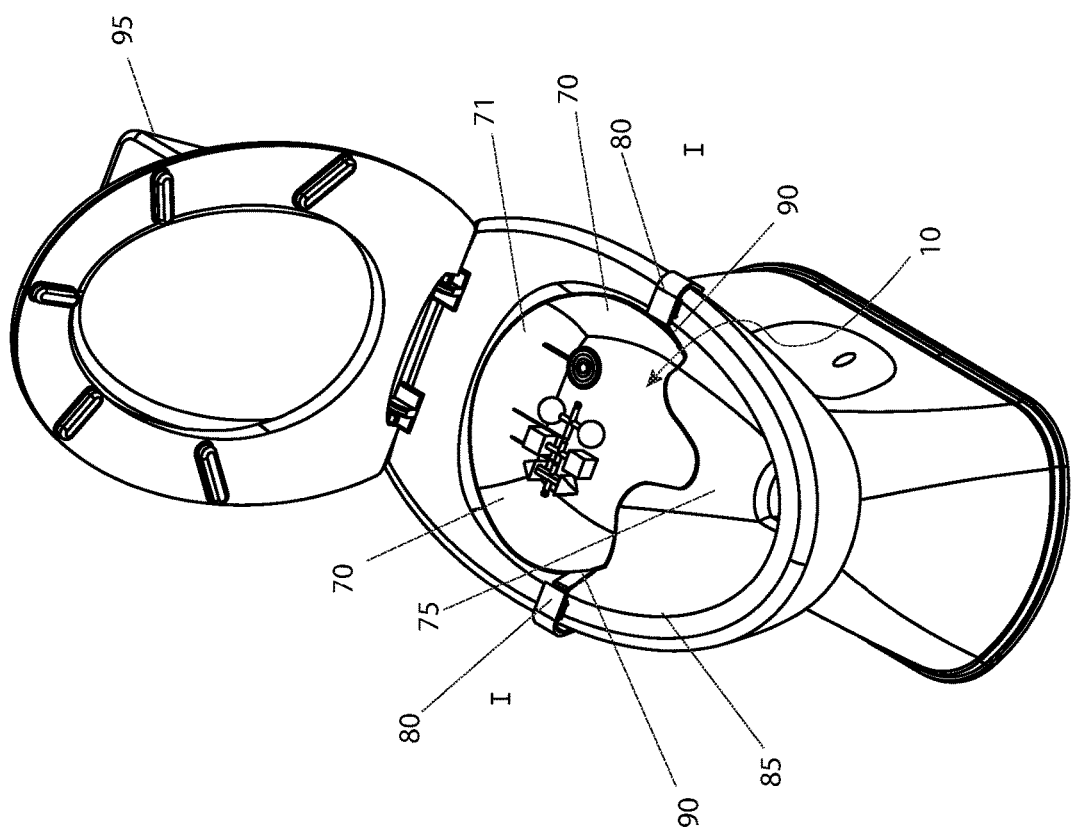
FIG. 1 is a perspective environmental view of a toilet training aid 10, in accordance with the preferred embodiment of the present invention.

DESCRIPTIVE KEY 10 toilet training aid
12 center protrusion
13 center body 21a first shape support
21b second shape support
22a first shape
22b second shape
22c third shape
23a first shape rotating member
23b second shape rotating member
23c third shape rotating member
24a planar first shape
24b planar second shape
24c planar third shape
25 shaft
26 cap
30 target
31 target support
70 curvilinear side section
71 curvilinear rear section
75 toilet bowl
80 hook
85 toilet bowl rim
90 hook support
92 receiver tube
94a pin
94b aperture
95 toilet

DETAILED DESCRIPTION OF THE PREFERRED EMBODIMENT

The present invention is directed to a toilet training aid (herein described as the "device") 10. In one (1) embodiment of the present invention, the device 10 may comprise a generally half-cup-shaped body, with a pair of hooks 80 adjustably attached to either opposing side and a plurality of generally three-dimensional plurality of shapes 22a, 22b, 22c and a target 30 attached to the cup-shaped body in a preferred embodiment (see FIG. 2A) or alternately a generally planar plurality of shapes 24a, 24b, 24c and a target 30 attached to the cup-shaped body in an alternate embodiment (see FIG. 2B).

Figure 3:
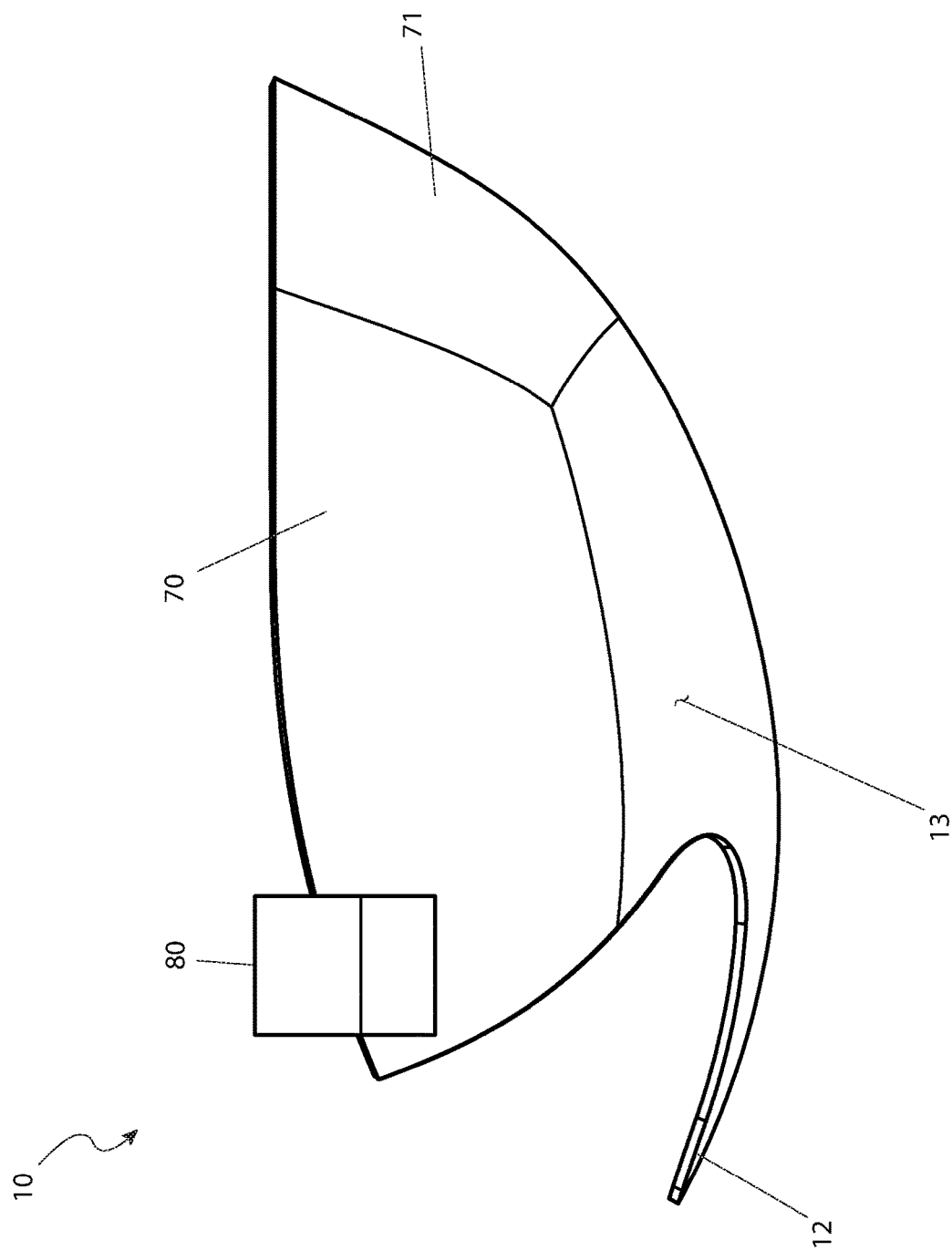
FIG. 3 is a side elevation view of the toilet training aid 10 depicting an internal spring portion 40, in accordance with the preferred embodiment of the present invention; and, FIG. 4 is a side view of an individual hook 80 and hook support 90, in accordance with the preferred embodiment of the present invention.

FIG. 3 illustrates the cup-shaped body, showing that it has a generally planar center body 13 portion, and a center protrusion 12 extending away from a center of the center body 13 at a first side. Each perimeter side edge of the center body 13 transitions into an upstanding curvilinear side section 70. A perimeter edge of the second side of the center body 13 transitions into an upstanding curvilinear rear section 71. The side edges of the curvilinear rear section 71 transitions into the second perimeter edges of the pair of curvilinear side sections 70. The curvilinear side sections 70 and rear section 71 are configured to mimic or correspondingly match the interior geometry of a toilet bowl 95 as much as possible. The center body 13 gently slopes downward from the second side to the first side, such that the center protrusion 12 may or may not extend into the water line within the toilet 95. The device 10 is intended to motivate and facilitate young children learning to utilize the toilet by creating a target surface for the urine stream or other bodily excretions.

Referring to FIG. 1 a perspective environmental view of a toilet training aid 10, shown in an installed state in a toilet bowl 95, according to an embodiment of the present invention is disclosed. The toilet training aid 10 is positioned entirely within the toilet bowl 95 immediately above the water line. The hooks 80 are adjustably attached to the hook supports 90, which are affixed to the opposing curvilinear side sections 70 at a top edge thereof. It is appreciated that these hook supports 90 can be affixed to the curvilinear side section 71 at any point on the respective upper edge, prior to the curvilinear read section 71, such that it enables the hooks 80 to properly contact and encompass a portion of the toilet bowl rim 85. As such, the toilet training aid 10 can be easily placed as needed for a young child using the invention, and quickly removed after use, thus returning the toilet 95 to use for older children and adults who need to utilize the toilet 95. The hook supports 90 may or may not be of a flexible segmented nature that are pushed in and out of the toilet training aid 10 as required to fit different sizes of toilet bowl 70 as well as accommodate different heights of the water line 75. The toilet training aid 10 should be positioned as low as possible in the toilet bowl 70 to prevent inadvertent splashing of urine, but just above the water line so as to not impede the functionality of the toilet training aid 10 as aforementioned described. The sloping nature of the center body 13 helps to direct collected urine or other items contacting the device 10, such as that aimed at the targets 22a, 22b, 22c, 24a, 24b, 24c, 30, towards the water of the toilet bowl 95.

Figure 2A:
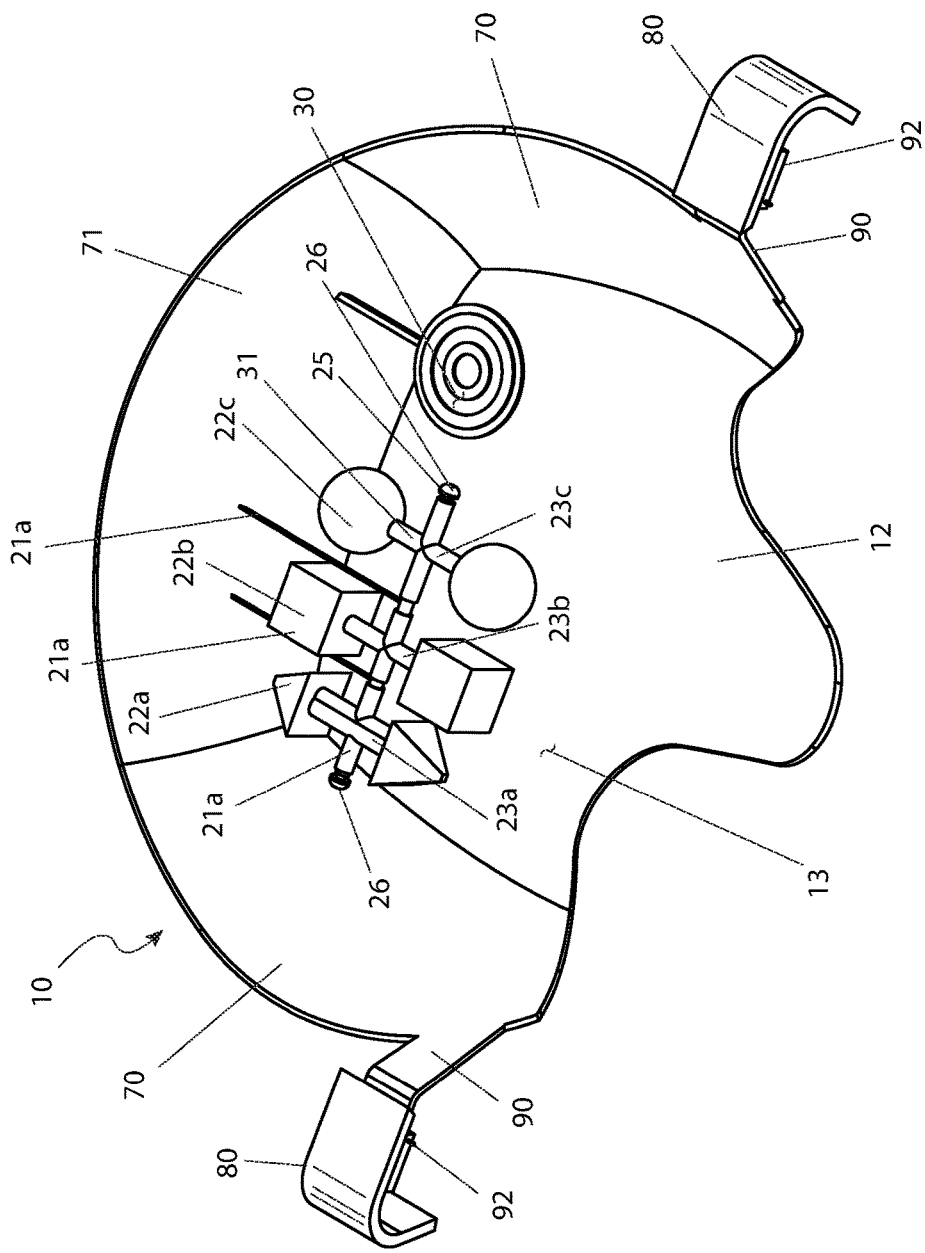
FIG. 2A is a top plan view of the toilet training aid, in accordance with the preferred embodiment of the present invention.
Figure 2B:
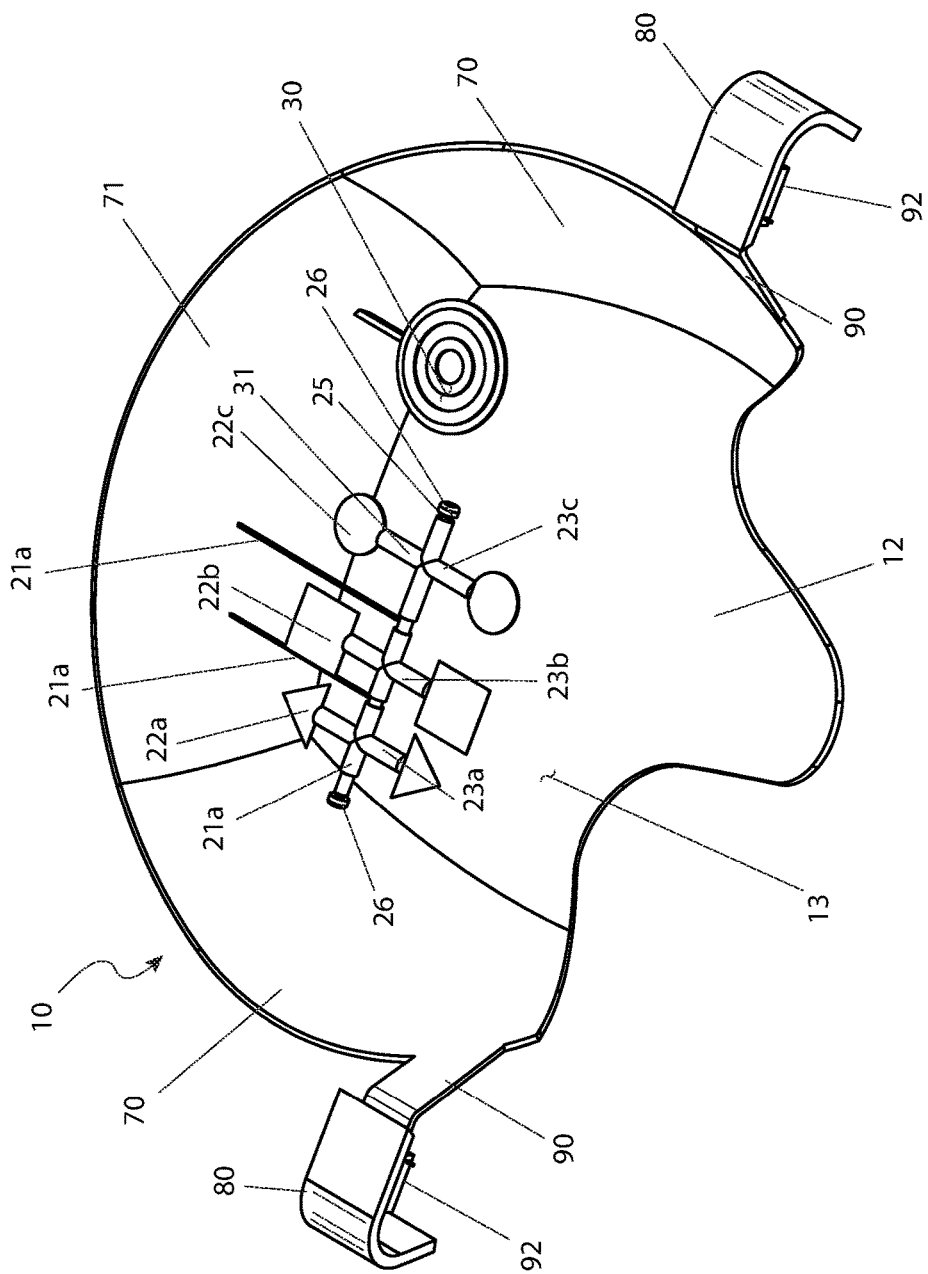
FIG. 2B is a top plan view of the toilet training aid, in accordance with an alternate embodiment of the present invention.

Referring now to FIG. 2A, which illustrates a top plan view of the device 10 in a preferred embodiment of the present invention, and FIG. 2B, which illustrates a top plan view of the device 10 in an alternate embodiment. A first shape supports 21a and second shape support 21b, disposed parallel to each other, are extended outward from a first side (e.g. left of a vertical bisecting centerline) of the curvilinear rear section 71 and angled slightly downward towards the center body 13. A similarly shaped and sized target support 31 extends outward from a second side (e.g. right of a vertical bisecting centerline) of the curvilinear rear section 71 and angled slightly downward towards the center body 13. Other embodiments can appreciate that the supports 21a, 21b, 31 can be angled upward. The supports 21a, 21b, 31 may be circular, square, or rectangular in cross-section.

The first and second shape supports 21a, 21b, support a shaft 25, generally cylindrical, which is rendered perpendicular to the said shape supports 21a, 21b. Preferably, the shaft is supported on either side of a vertical bisecting centerline by the shape supports 21a, 2b, which are equidistant from the aforementioned shaft 25 vertical bisecting centerline. Either removable or affixed caps 26 are attached to the terminal distal ends of the shaft 25. Located towards a first distal end of the shaft 25, and between the respective cap 26 and the first shape support 21a, is a first shape rotating member 23a. Located between the shape supports 21a, 21b is a second shape rotating member 23b. Located towards a second distal end of the shaft 25, and between the respective cap 26 and the second shape support 21b, is a third shape rotating member 23c. The rotating members 23a, 23b, 23c, each rotate independently relative to the shaft 25, and can be accomplished by either a small gap or clearance between the respective rotating member 23a, 23b, 23c, and the shaft 25, of the respective rotating member 23a, 23b, 23c, can be attached to the shaft 25 via a bearing, that enables free rotation. Each rotating member 23a, 23b, 23c has a tubular first portion that encompasses the shaft and is freely rotatable relative to, and a pair of diametrically-opposing second portions, each having a first end affixed to the first portion. As such, each rotating member 23a, 23b, 23c, generally resembles a "+", or a cross shape.

Referring now to FIG. 2A, affixed to or removably attached to the second ends of each of the second portions of the rotating members 23a, 23b, 23c is a generally three-dimensional shape 22a, 22b, 22c. For purposes of illustration, the first rotating member 23a supports a pair of first shapes 22a in the shape of a triangular prism, the second rotating member 23a supports a pair of second shapes 22a in the shape of a cube, and the third rotating member 23a supports a pair of third shapes 22a in the shape of a sphere. Referring now to FIG. 2B, affixed to or removably attached to the second ends of each of the second portions of the rotating members 23a, 23b, 23c is a generally planar shape 24a, 24b, 24c. For purposes of illustration, the first rotating member 23a supports a pair of first shapes 24a in the shape of a triangle, the second rotating member 23a supports a pair of second shapes 24a in the shape of a square, and the third rotating member 23a supports a pair of third shapes 24a in the shape of a circle. It is appreciated that any geometrical shape, or other types of art, can be used and still fall under the scope of the invention. It is intended that a directed stream of urine or any other directed item can contact any of the shapes 22a, 22b, 22c, 24a, 24b, 24c, and cause the respective rotating member 23a, 23b, 23c, to rotate about the shaft 25 to provide an entertaining and visual proof of contact.

Either embodiment also includes the target 30, which is affixed to the opposing distal end of the target support 31. The target 30 has expected and conventional bulls-eye target indicia located thereon, and as such is generally a planar circle shape. Any other art or shape of the target 30 is appreciated as still falling under the overall scope of the present invention.

The surface of the center body 13 may be applied with thermal paint that activates with the heat from the urine. The thermal paint may change the color in specific areas such as any of the center body 13, center protrusion 12, curvilinear side sections 70, curvilinear rear section 71, rotatable objects 22a, 22b, 22c, 23a, 23b, 23c, 24a, 24b, 24c, supports 21a, 21b, 31, or the target 30.

Figure 4:
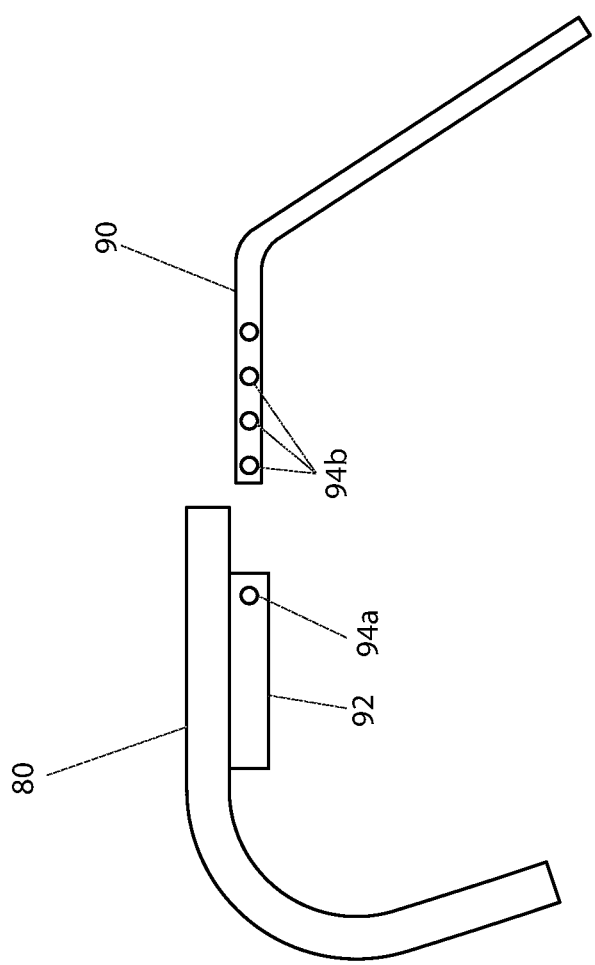

The device 10 may accommodate a variety of toilets 95 with different pressure systems and water heights. FIG. 4, shows a side view of an individual hook 80 and hook support 90. It is appreciated that both hook 80 and hook supports 90 are described in a similar fashion. The hook support 92 are affixed to any part of an upper perimeter edge of the curvilinear side section 70. The hook support 90 is a two-part planar portion, with a first part attached to an angling upward and outward from the curvilinear side section 70 and a second part intended to parallel with an upper surface of the toilet bowel rim 85. The distal end of the second part includes a plurality of evenly-spaced apertures 94b. The hook 80 has a curvilinear distal first end that is intended to encompass a majority of the toilet bowl rim 85 and a second part that is parallel with the upper surface of the toilet bowl rim 85 and the second part of the hook support 90. Affixed underneath and oriented longitudinally with the second support of the hook 90 is a receiver 92, capable of slidably receiving the second part of the hook support 90. The distal end of the receiver 92, facing the hook support 90, is a spring-loaded pin 94a, capable of securing the hook 80 to the hook support 90 when the pin 94a is inserted into a desired aperture 94b.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A toilet training aid, comprising:
   a body;
   a first target attached to said body and extending away therefrom with at least one first target support;
   a second target attached to said body adjacent said first target and extending away therefrom with at least one second target support; and
   a pair of mounts each adjustably attached to opposing sides of said body;
   wherein said pair of mounts are capable of securely encompassing a portion of a toilet bowl rim to suspend said body within a toilet bowl;
   wherein said body further comprises:
   a planar bottom wall sloping downward from a rear side towards a front side;
   a curvilinear first side wall affixed to and vertically extending away from a first perimeter edge of said bottom wall;
   a first hook support affixed to said first side wall adjacent an upper edge thereof;
   a curvilinear second side wall affixed to and vertically extending away from a first perimeter edge of said bottom wall;
   a second hook support affixed to said second side wall adjacent an upper edge thereof; and
   a curvilinear rear wall affixed to and vertically extending away from a perimeter edge of said bottom wall rear side, having a first side edge affixed to a first side wall rear edge and having a second side edge affixed to a second side wall rear edge;
   wherein a first one of said pair of mounts is removably attachable to said first hook support;
   wherein a second one of said pair of mounts is removably attachable to said second hook support; and
   wherein said first target and said second target are each affixed to and extend away from said rear wall.

2. The aid of claim 1, wherein said first side wall, said second side wall, and said rear wall comprises a shape generally matching that of an interior surface of a rear side of said toilet bowl.

3. The aid of claim 2, further comprising a protrusion located at a center of said bottom wall front side, coplanar with said bottom wall.

4. The aid of claim 1, wherein said first target further comprises:
   a shaft;
   a first cap located at first distal end of said shaft;
   a first rotating member independently rotatable relative to said shaft and located adjacent to said first distal end of said shaft, further having a pair of first target elements located on either side of said shaft;
   a second rotating member independently rotatable relative to said shaft and located at a center of said shaft, further having a pair of second target elements located on either side of said shaft;
   a third rotating member independently rotatable relative to said shaft and located adjacent to said second distal end of said shaft, further having a pair of third target elements located on either side of said shaft;
   a first target support having a first end affixed to said shaft between said first rotating member and said second rotating member, and a second end affixed to a rear wall of said body; and a second target support having a first end affixed to said shaft between said second rotating member and said third rotating member, and a second end affixed to a rear wall of said body.

5. The aid of claim 4, wherein:
said pair of first target elements have a triangular cross-section;
said pair of second target elements have a square cross-section; and
said pair of third target elements have a circular cross-section.

6. The aid of claim 4, wherein said first target support and said second target support are each mounted to said rear wall at an angle directing said first target and said second target towards said bottom wall.

7. The aid of claim 1, wherein said first target further comprises:
a shaft;
a first cap located at first distal end of said shaft;
a first rotating member independently rotatable relative to said shaft and located adjacent to said first distal end of said shaft, further having a pair of first target elements located on either side of said shaft;
a second rotating member independently rotatable relative to said shaft and located at a center of said shaft, further having a pair of second target elements located on either side of said shaft;
a third rotating member independently rotatable relative to said shaft and located adjacent to said second distal end of said shaft, further having a pair of third target elements located on either side of said shaft;
a first target support having a first end affixed to said shaft between said first rotating member and said second rotating member, and a second end affixed to said rear wall; and
a second target support having a first end affixed to said shaft between said second rotating member and said third rotating member, and a second end affixed to said rear wall.

8. The aid of claim 7, wherein:
said pair of first target elements have a triangular cross-section;
said pair of second target elements have a square cross-section; and
said pair of third target elements have a circular cross-section.

9. The aid of claim 7, wherein said first target support and said second target support are each mounted to said rear wall at an angle directing said first target and said second target towards said bottom wall.

10. A toilet training aid, comprising:
a body having a portion thereof coated with a thermal-activated coating;
a first target attached to said body and extending away therefrom with at least one first target support;
a second target attached to said body adjacent said first target and extending away therefrom with at least one second target support; and
a pair of mounts each adjustably attached to opposing sides of said body;
wherein said pair of mounts are capable of securely encompassing a portion of a toilet bowl rim to suspend said body within a toilet bowl;
wherein said body further comprises:
a planar bottom wall sloping downward from a rear side towards a front side;
a curvilinear first side wall affixed to and vertically extending away from a first perimeter edge of said bottom wall;
a first hook support affixed to said first side wall adjacent an upper edge thereof;
a curvilinear second side wall affixed to and vertically extending away from a first perimeter edge of said bottom wall;
a second hook support affixed to said second side wall adjacent an upper edge thereof; and;
a curvilinear rear wall affixed to and vertically extending away from a perimeter edge of said bottom wall rear side, having a first side edge affixed to a first side wall rear edge and having a second side edge affixed to a second side wall rear edge;
wherein a first one of said pair of mounts is removably attachable to said first hook support;
wherein a second one of said pair of mounts is removably attachable to said second hook support; and
wherein said first target and said second target are each affixed to and extend away from said rear wall.

11. The aid of claim 10, wherein said first side wall, said second side wall, and said rear wall comprises a shape generally matching that of an interior surface of a rear side of said toilet bowl.

12. The aid of claim 11, further comprising a protrusion located at a center of said bottom wall front side, coplanar with said bottom wall.

13. The aid of claim 10, wherein said first target further comprises:
a shaft;
a first cap located at first distal end of said shaft;
a first rotating member independently rotatable relative to said shaft and located adjacent to said first distal end of said shaft, further having a pair of first target elements located on either side of said shaft;
a second rotating member independently rotatable relative to said shaft and located at a center of said shaft, further having a pair of second target elements located on either side of said shaft;
a third rotating member independently rotatable relative to said shaft and located adjacent to said second distal end of said shaft, further having a pair of third target elements located on either side of said shaft;
a first target support having a first end affixed to said shaft between said first rotating member and said second rotating member, and a second end affixed to a rear wall of said body; and
a second target support having a first end affixed to said shaft between said second rotating member and said third rotating member, and a second end affixed to a rear wall of said body.

14. The aid of claim 13, wherein:
said pair of first target elements have a triangular cross-section;
said pair of second target elements have a square cross-section; and
said pair of third target elements have a circular cross-section.

15. The aid of claim 13, wherein said first target support and said second target support are each mounted to said rear wall at an angle directing said first target and said second target towards said bottom wall.

16. The aid of claim 10, wherein said first target further comprises:
a shaft;
a first cap located at first distal end of said shaft;

a first rotating member independently rotatable relative to said shaft and located adjacent to said first distal end of said shaft, further having a pair of first target elements located on either side of said shaft;

a second rotating member independently rotatable relative to said shaft and located at a center of said shaft, further having a pair of second target elements located on either side of said shaft;

a third rotating member independently rotatable relative to said shaft and located adjacent to said second distal end of said shaft, further having a pair of third target elements located on either side of said shaft;

a first target support, having a first end affixed to said shaft between said first rotating member and said second rotating member, and a second end affixed to said rear wall; and a second target support, having a first end affixed to said shaft between said second rotating member and said third rotating member, and a second end affixed to said rear wall.

17. The aid of claim 16, wherein:

said pair of first target elements have a triangular cross-section;

said pair of second target elements have a square cross-section; and said pair of third target elements have a circular cross-section.

18. The aid of claim 16, wherein said first target support and said second target support are each mounted to said rear wall at an angle directing said first target and said second target towards said bottom wall.

\* \* \* \* \*